Patented Aug. 22, 1933

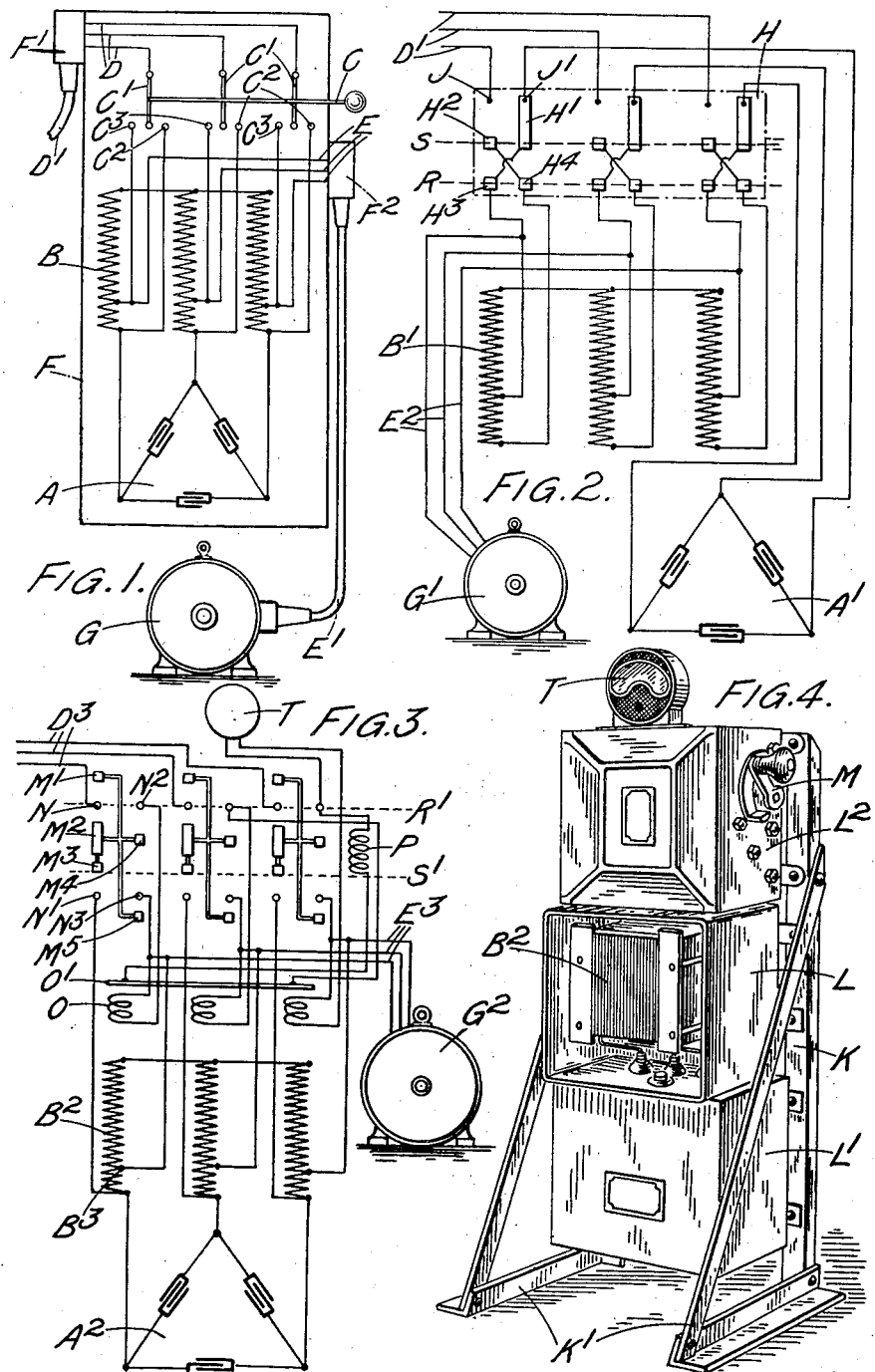

1,923,624

UNITED STATES PATENT OFFICE

1,923,624

CONTROL OF ALTERNATING CURRENT MOTORS AND THEIR SUPPLY CIRCUITS

Arnold Henry Human, Newbury, England, assignor to Electrical Improvements Limited, Newcastle-upon-Tyne, England Application November 13, 1931, Serial No. 574,893, and in Great Britain November 21, 1930

7 Claims. (Cl. 172—233)

This invention relates to the control of A. C. circuits for supplying current to one or more electric motors. It has been proposed to connect a static condenser across such a circuit or across each motor connected to the circuit for the purpose of eliminating or reducing the wattless current and thus improving the power factor of the circuit and lowering the demand on the supply mains. Such condensers are usually oil-immersed, and since the capacity of the condenser increases approximately as the square of the supply voltage, it is often more economical to interpose a transformer between the condenser and the main circuit, in order to step up the voltage supplied to the condenser thereby enabling the size of the condenser to be reduced. Alternatively, with a high supply voltage, it may be more economical to employ lower voltage condensers in which case the voltage supplied to the condensers may be stepped down to a convenient value.

The present invention is applicable to arrangements of this kind wherein the individual motors are started by means of transformers, and has for its object to simplify and to effect economy in the construction of the control apparatus provided for each motor in such arrangements.

In the arrangement according to the present invention a condenser is employed with each motor for improving the power factor of the circuit, and a single transformer is utilized both for controlling the starting of the motor and for stepping-up or stepping-down the supply voltage to the condenser. With this arrangement the transformer and condenser can be adequately protected and controlled by means of a single switch. Preferably the transformer and the condenser are immersed (with or without the control switch) in the same body of oil contained within a single tank.

Three arrangements of control unit according to the invention which are particularly suitable for three-phase squirrel-cage induction motors will now be described, by way of example, with reference to the accompanying drawing, in which Figure 1 illustrates one arrangement diagrammatically, Figure 2 is a wiring diagram of another arrangement, and Figures 3 and 4 show a wiring diagram and a perspective view respectively of the preferred form of control unit.

The control unit shown in Figure 1 comprises a three-phase delta-connected condenser A, a three-phase star-connected auto-transformer B and a three-phase control switch C. The switch C, which is indicated diagrammatically as a three-way switch although in practice it is conveniently of the rotary type, has three positions, an off position in which it is shown, a starting position in which the arms $C^1$ engage the contacs $C^2$ and a running position in which the arms $C^1$ engage the contacts $C^3$.

The three-phase supply circuit D is connected to the arms $C^1$ of the switch whilst the contacts $C^2$ and $C^3$ are respectively connected to the free ends of the auto-transformer windings and to tapping points on these windings in the corresponding phases. The terminals of the condenser A are directly connected to the free ends of the transformer windings and the out-going leads E for the motor to the tapping points on the transformer windings.

In the off position of the switch the condenser and transformer are isolated from the supply circuit D but, since the condenser A and the motor leads E are permanently connected to the auto-transformer B, the transformer and motor form an adequate discharge circuit for the condenser A.

In the starting position of the switch C the three phases of the supply circuit D are connected respectively to the ends of the auto-transformer windings so that a reduced voltage, the value of which depends on the position of the tapping points, is applied to the motor and the full line voltage is applied to the condenser A. When the switch is moved to the running position, the phases of the supply circuit D are connected to the tapping points so that the full line voltage is applied to the motor whilst the voltage applied to the condenser A is stepped up.

In the case for example of a 400 volt supply circuit and a condenser designed for, say, 600 volts the tapping points on the transformer B may be arranged so that in the running position, with the supply circuit D directly connected to the motor leads E and to the transformer tapping points, the voltage applied to the condenser is stepped up to 600 volts. Thus in the starting position of the switch C, with the 400 volt supply circuit connected to the ends of the transformer windings, the starting voltage applied to the motor is 267 volts.

The unit is conveniently arranged with the transformer B mounted above the condenser A in a single tank F, indicated in chain lines in Figure 1, so that the condenser and the transformer are immersed in the same body of oil.

The switch can then be mounted in the top of the tank and also, if desired, be immersed in the oil. The tank F is provided with a gland $F^1$ for the cable $D^1$ of the incoming supply circuit D and a gland $F^2$ for the cable $E^1$ from the outgoing supply leads E to the motor G.

It is to be noted that in the starting position of the switch the condenser is directly connected to the line so that it is only supplied with the normal line voltage instead of a stepped up voltage. This arrangement has the advantage that the starting surge, which might be objectionably large if the condenser were supplied with the full stepped up voltage during starting, is considerably reduced. Should it be desirable to reduce this surge still further the switch may be arranged to connect the condenser to the tapping points of the transformer so that it is supplied with the motor starting voltage when the switch is in the starting position in the manner indicated in the wiring diagram of Figure 2.

In the arrangement shown in this figure a switch H of the drum controller type is employed, each phase of the controller having rotary segments $H^1-H^4$ which cooperate with contact fingers J, $J^1$. The motor $G^1$ is connected by the leads $E^2$ to the tapping points on the windings of the transformer $B^1$, these tapping points also being connected to the segments $H^3$ of the controller. The ends of the transformer windings are connected to the segments $H^4$ whilst the supply circuit $D^1$ and the condenser $A^1$ are respectively connected to the contact fingers J and $J^1$.

In the off position of the controller H, in which it is shown, the condenser $A^1$ is connected through the contact fingers $J^1$ and the segments $H^1$, $H^3$ (which are permanently connected) to the tapping points of the transformer windings so that the transformer and motor windings provide a discharge circuit for the condenser. In the starting position of the controller, indicated by the dotted line S, the supply circuit $D^1$ is connected through the contact fingers J and the segments $H^2$ $H^4$ (which are also permanently connected) to the ends of the transformer windings. The motor is thus supplied with the appropriate starting voltage which since, in this position of the controller, segments $H^1$ remain in contact with fingers $J^1$, is also supplied to the condeser $A^1$. In the running position of the controller, indicated by the dotted line R, the supply circuit $D^1$ is connected through the fingers J and the segments $H^3$ to the tapping points of the transformer windings whilst condenser $A^1$ is connected through the fingers $J^1$ and the segments $H^4$ to the ends of the transformer windings. The full line voltage is thus applied to the motor and a stepped up voltage to the condenser.

The preferred form of unit shown in Figures 3 and 4 is generally similar in operation to that shown in Figure 1. The unit is mounted on a mild steel framework K having brackets $K^1$ by means of which it can be fixed to the floor. This framework supports three tanks L $L^1$ $L^2$ respectively containing an air-cooled three-phase star-connected auto-transformer $B^2$, an oil-immersed three-phase delta-connected condenser $A^2$ and a switch M of the drum controller type. The condenser $A^2$ is directly connected to the three ends of the transformer windings by leads passing through the bottom of tank L and top of tank $L^1$. Each phase of the transformer is provided with a tapping point $B^3$ to which the outgoing leads $E^3$ for the motor $G^2$ (shown in chain lines) are directly connected. The control switch is arranged so that in the starting position the supply circuit is connected to the ends of the transformer windings whilst in the running position it is connected to the tapping points as in the arrangement shown in Figure 1.

Each phase of the controller M is provided with drum contacts or segments $M^1-M^5$ which are connected together and cooperate with contact fingers $N-N^3$. An overload relay O is connected between the fingers $N^2$ and $N^3$ of each phase so that it is only in circuit in the running position of the controller, the overload relays acting on a common armature $O^1$ which is arranged in the circuit of a low voltage release relay P connected to the fingers $N^2$ of two of the phases. The relay P is thus deenergized to cause the release of automatic mechanism (not shown) for returning the controller M to the off position when the supply voltage drops below a predetermined value or when any one of the overload relays O operates. An ammeter T is connected in series with the overload relay O in one of the phases so as to give an indication of the current flowing to the motor and is conveniently mounted on the top of the tank $L^2$ containing the controller.

In the off position of the controller, in which it is shown, the incoming supply circuit $D^3$ is isolated from the transformer and condenser.

In the starting position of the controller, indicated by the dotted line $S^1$, the supply circuit is connected through the fingers N, the segments $M^1$ and $M^3$ and the fingers $N^1$ to the free ends of the windings of the transformer $B^2$. The motor $G^2$ is thus supplied with a reduced starting voltage and the condenser $A^2$ with the full line voltage.

As the controller is moved to the running position, indicated by the dotted line $R^1$, the incoming supply circuit $D^3$ is connected through the fingers N, the segments $M^2$ and $M^3$ and the fingers $N^3$ to the tapping points $B^3$ of the windings of the transformer $B^2$. The motor $G^2$ is thus directly connected to the supply circuit $D^3$ whilst the voltage applied to the condenser $A^2$ is stepped up to the appropriate value. Further movement of the controller causes the segments $M^4$ to engage the fingers $N^2$ and the segments $M^5$ to leave the fingers $N^3$, thus introducing the overload relays in series between the supply circuit and the transformer tapping points. This arrangement ensures that the relays are not operated to trip the controller by the surge which may occur when the motor is first supplied with the full line voltage.

It will be appreciated that the above arrangements are by way of example only and that modifications may be made within the scope of the invention. For example with high supply voltages the motor may be wound for the full line voltage and a transformer may be employed to step-down the voltage to the condenser, a control switch being arranged on the high voltage side of the transformer or the transformer may be employed to step-down the voltage to both the condenser and the motor in which case the control switch may be arranged on the low voltage side of the transformer. It will also be understood that although the invention has been described for use with three-phase squirrel cage induction motors it is equally applicable for other forms of motor and for A. C. motors supplied from single or polyphase systems.

What I claim as my invention and desire to secure by Letters Patent is:—

1. In apparatus for the control of an A. C. circuit supplying current to an electric motor, the combination of a condenser for improving the power factor of the circuit, an auto-transformer having at least one tapping point, a control switch for the auto-transformer having an off position and two operative positions, means whereby in the first operative position of the switch a reduced starting voltage is applied to the motor and the full supply voltage is applied to the condenser, and means whereby in the second operative position of the switch the full running voltage is applied to the motor and an increased voltage is applied to the condenser.

2. In apparatus for the control of an A. C. circuit supplying current to an electric motor, the combination of a condenser for improving the power factor of the circuit, an auto-transformer having at least one tapping point, a control switch for the auto-transformer having an off position and two operative positions, means whereby in the first operative position of the switch a reduced starting voltage is applied to the motor and to the condenser, and means whereby in the second operative position the full running voltage is applied to the motor and an increased voltage is applied to the condenser.

3. In apparatus for the control of an A. C. circuit supplying current to an electric motor, the combination of a condenser for improving the power factor of the circuit, a transformer having at least one tapping point, an oil-tank within which the transformer and the condenser are immersed in the same body of oil, external connections for connecting the transformer to the motor and to the A. C. supply circuit, connections within the tank between the transformer and the condenser, and a single switch controlling the transformer connections whereby the transformer is utilized for controlling both the starting of the motor and the supply voltage to the condenser.

4. In apparatus for the control of a polyphase circuit supplying current to a polyphase electric motor, the combination of a polyphase star-connected auto-transformer, a polyphase condenser directly connected to the ends of the auto-transformer windings, connections from the motor to the tapping points on the auto-transformer windings, and a three-position control switch for connecting the polyphase supply circuit either to the ends or to the tapping points of the auto-transformer windings or for isolating such windings from the supply circuit.

5. In apparatus for the control of an A. C. circuit supplying current to an electric motor, the combination of a condenser for improving the power factor of the circuit, an oil tank within which the condenser is immersed in oil, an air cooled transformer mounted above the condenser oil tank, connections from the transformer to the A. C. supply circuit the motor and the condenser, and means for controlling the transformer connections whereby the transformer is utilized to supply a reduced voltage to the motor during starting thereof and also to supply to the condenser a voltage different from that of the A. C. supply circuit during normal running of the motor.

6. In apparatus for the control of an A. C. circuit supplying current to an electric motor, the combination of a condenser for improving the power factor of the circuit, an auto-transformer having at least one tapping point, connections from the auto-transformer to the motor the A. C. supply circuit and the condenser, and a single switch for controlling the auto-transformer connections whereby the auto-transformer is utilized to supply a reduced voltage to the motor during starting thereof and also to supply to the condenser a voltage different from that of the supply circuit during normal running of the motor.

7. In apparatus for the control of an A. C. circuit supplying current to an electric motor, the combination of a condenser for improving the power factor of the circuit, a transformer, connections from the transformer to the A. C. supply circuit, the motor and the condenser, and switching means for controlling the transformer connections whereby the transformer is utilized to supply a reduced voltage to the motor during starting thereof and also to supply to the condenser a voltage different from that of the A. C. supply circuit during normal running of the motor.

ARNOLD HENRY HUMAN.